United States Patent [19]

Orozco

[11] 4,254,852
[45] Mar. 10, 1981

[54] FREE-WHEELING MECHANISM

[76] Inventor: Hector M. Orozco, Fuego No. 986 Pedregal de San Angel, Mexico 20, D.F., Mexico

[21] Appl. No.: 922,886

[22] Filed: Jul. 7, 1978

[30] Foreign Application Priority Data

Jan. 2, 1978 [MX] Mexico .................................. 171911

[51] Int. Cl.³ .............................................. F16D 41/18
[52] U.S. Cl. .................................. 192/46; 192/113 B
[58] Field of Search ...................... 192/41 R, 41 S, 45, 192/42, 46, 64, 113 B, 70.12; 74/217 B, 243 R

[56] References Cited

U.S. PATENT DOCUMENTS

| 656,549 | 8/1900 | Kennedy | 192/46 |
|---|---|---|---|
| 709,900 | 9/1902 | Gurney et al. | 192/46 |
| 756,086 | 3/1904 | Weiler | 192/46 |
| 1,219,698 | 3/1917 | Brackett | 192/42 |
| 1,883,966 | 10/1932 | Krause | 192/46 X |
| 2,323,353 | 7/1943 | Plog | 192/42 X |
| 3,651,909 | 3/1972 | Zautaszwili | 192/113 B |

FOREIGN PATENT DOCUMENTS

411430 8/1945 Italy ........................................ 74/217 B

*Primary Examiner*—George H. Krizmanich
*Attorney, Agent, or Firm*—Ladas & Parry

[57] ABSTRACT

This invention refers in general to free-wheeling mechanisms of industrial use and more particularly concerns a simple free-wheeling unit which comprises as principal parts a spring-and-ratchet mechanism housed in an ellipsoidal slot stamped in the central sprocket or crown gear. This free-wheeling mechanism is actuated at the required moment by the torque action generated by the spring which makes the ratchet engage the peripheral milled slots of the central sleeve which forms part of the free-wheeling mechanism. In addition to having the function of stopping rotation of the wheel in one direction, the mechanism also houses on each side in respective channels the lubricated roller balls, favoring wheel rotation.

9 Claims, 19 Drawing Figures

FREE-WHEELING MECHANISM

SUMMARY OF THE DESCRIPTION

The principal object of this invention is to provide a new variant of the free-wheeling mechanism which is so widely used in industry. The free-wheeling mechanism herein described includes improvements both in the process of manufacture and in characteristics of the invention. Furthermore the economic advantages to be obtained are evident when relatively low cost methods of manufacture are used for making the wheel, such as stamping and milling, instead of forming, broaching and stamping just to obtain the cavities in which the pawl of the sprocket can catch, which is fundamental to the free-wheeling mechanism.

The new system to be described consists of a new variant for the free-wheeling mechanism, which is composed of a sprocket of special type since the latter is produced entire by stamping. The sprocket will contain the ellipsoid cavities wherein the locking elements or pawls are contained. Furthermore, it consists of a turned central sleeve, which will carry the milled slots on its periphery.

In the said slots the pawls will lock, preventing wheel rotation in the undesired direction, by means of the new type of spring also incorporated.

The mechanism is closed up by means of two cups, one to the left and the other to the right, by means of four assembly screws. Both the sleeve and the cups will carry the necessary channels upon which the balls will run. The latter as is well known facilitate rotation of the mechanism and reduce losses from friction so far as possible.

Another advantage of the free-wheeling mechanism herein described in the feasibility of making the sprockets or toothed wheels easily interchangeable. Such change can be for the purpose of changing the transmission ratios, or for maintenance of the sprocket itself or of the entire wheel. It should be noted that to perform this operation it is only necessary to remove the four screws mentioned above.

Another advantage of the free-wheeling mechanism herein described consists of the new type of pawl-spring mechanism. This mechanism has the characteristic of functioning when required in a direction opposite to that of centrifugal force, and when not required, in the direction of centrifugal force, the latter moment being when it is desired for the wheel to turn free. At such time the wheel will continue to spin by its own inertia from the movement already produced, and as is noted the pawls will not lock but to the contrary will tend to open, and thus will not produce an increase in friction to the detriment of the speed of rotation.

The spring used has the advantage of functioning torsionally, and performs two primary functions. These functions consist of pressing the pawl against the peripheral milled openings in the sleeve at the required time, and of holding it in position without allowing it to escape from the ellipsoidal housing in the sprocket hub. It should be mentioned that with a simple substitution of the cups it is possible to attach one or two additional sprockets; this change consists of using a cup with a reduction in its inside diameter. Upon the additional solid wall surface so obtained the additional sprockets are attached by means of mounting screws. In the case of the multiple wheel it will be necessary to make a series of slots and perforations both on the sprockets and on the sleeve, for use in extracting the piece.

Other important objects and advantages of the device here presented of the present invention will become apparent in the present description and the accompanying drawings, which for purposes of illustration show only one specific form of the invention which is described in detail.

DETAILED DESCRIPTION OF THE INVENTION

Figure 8:
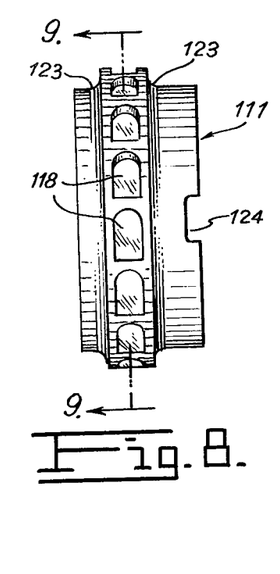
FIG. 8 provides a view in front elevation of the central sleeve in the simple version of the free-wheeling mechanism.
Figure 9:
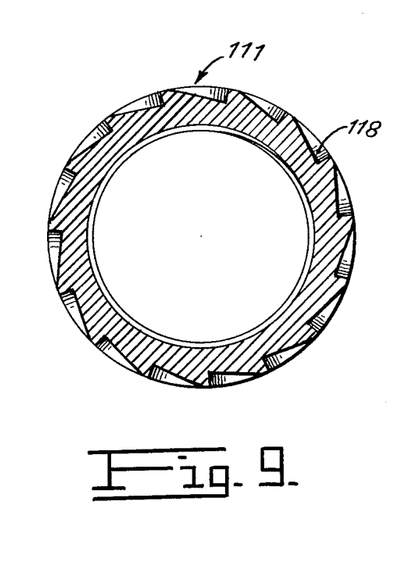
FIG. 9 shows a cross-section through the center of the sleeve of either the simple or the multiple version of the free-wheeling mechanism. In this figure as well as the proceding one it is possible to distinguish the peripheral cavities in the outer surface of the sleeve.
Figure 10:
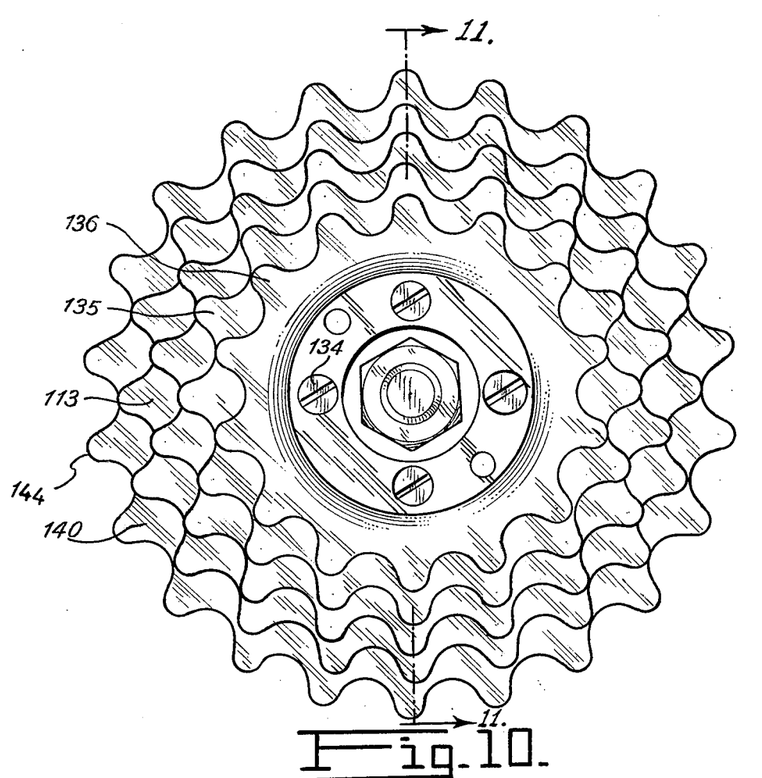
FIG. 10 affords a face-on view from the right of the multiple-sprocket free-wheeling mechanism as assembled.

Referring now specifically to FIG. 8, the reference No. 111 indicates the central sleeve of the free-wheeling mechanism. Peripheral indentations or slots 118 are clearly identified, in which the pawls 114 lodge at the proper time. The said pawls 114 are actuated by springs 115, clearly shown in FIG. 2. Both pawls 114 and springs 115 are housed in the elliptical slots 119, shown in FIG. 12.

Sprocket 113 also has a plurality of perforations 120 through which pass the mounting screws 116. Mounting screws 116 also pass through the plurality of perforations 120 formed in right cup 127 and screw into threaded perforations 121 of left cup 112. Both right cup 127 and left cup 112 have identical shoulders 122 the inside surfaces of which provides external ball races for balls 117, when assembled, on each side of the mechanism. The internal race for the balls 117 is formed by channels 123 on opposite outer shoulders of sleeve 111. An assembled view is provided in FIG. 11.

It is important to note the ready replaceability of central sprocket 113. The plurality of screws 116 are removed, thus opening the mechanism, which is fitted with a new sprocket 113 and closed up again.

Figure 12:
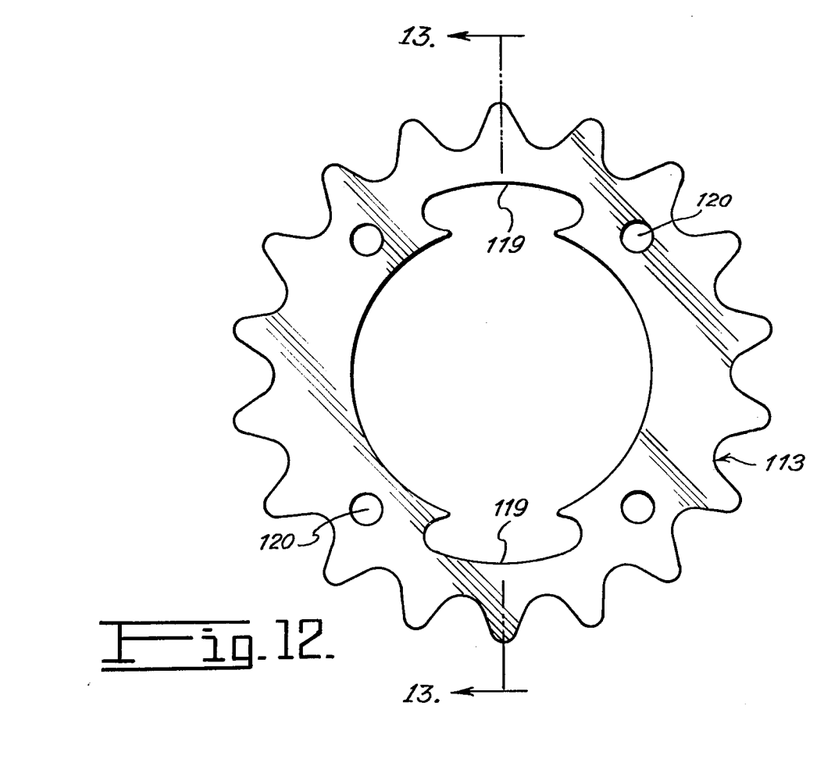
FIG. 12 affords a frontal view of the stamped central sprocket of either the simple of the multiple-sprocket version of the free-wheeling mechanism; here it is possible to see clearly the ellipsoidal slots produced by stamping and the orifices to admit assembly screws.
Figure 13:
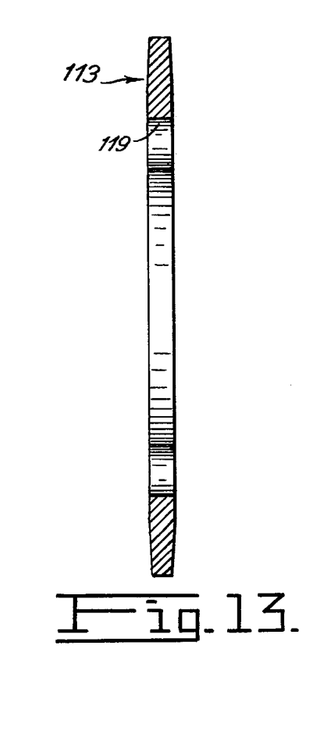
FIG. 13 represents a cross-section of the central stamped sprocket shown in FIG. 12.

It is evident in FIG. 12 that central sprocket 113 can be produced as a simple stamping, producing thereby both the external teeth and the internal bore and the ellipsoidal slots 119 to house pawls 114 and springs 115.

FIGS. 3, 7, 8 and 9 show the simplicity of construction of central sleeve 111 of the free-wheeling mechanism of this invention. Sleeve 111 is first turned and tapped, then the peripheral slots 118 are cut to receive pawls 114. It also bears end notches 124, used for unscrewing it from the internal member.

Figure 3:
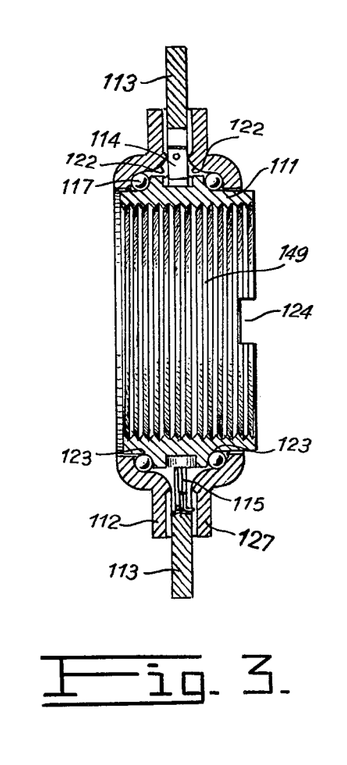
FIG. 3 is a cross-sectional view of the mechanism from the front, clearly showing the position of the spring-pawl mechanism.
Figure 4:
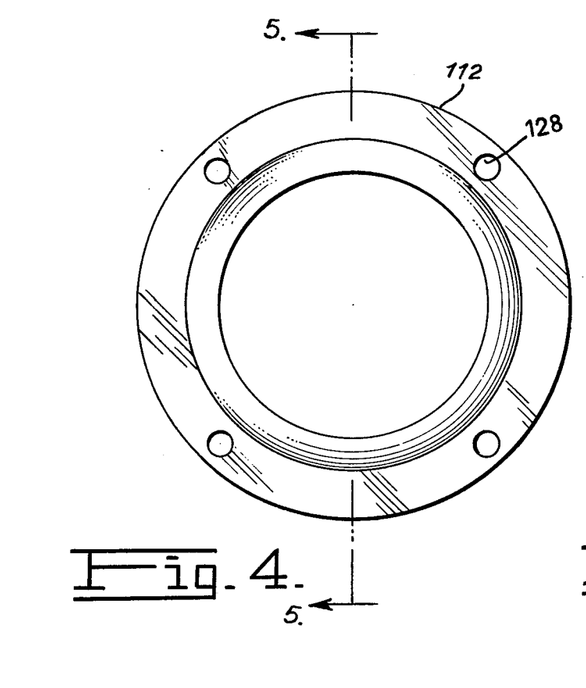
FIG. 4 is a side-on view of cup.

Cross-sectional assembly view of FIG. 3 illustrates the spatial relationships of central sleeve 111 to right cup 127 and left cup 112, central sprocket 113, balls 117 and pawls 114 in the free-wheeling mechanism of this invention.

Figure 1:
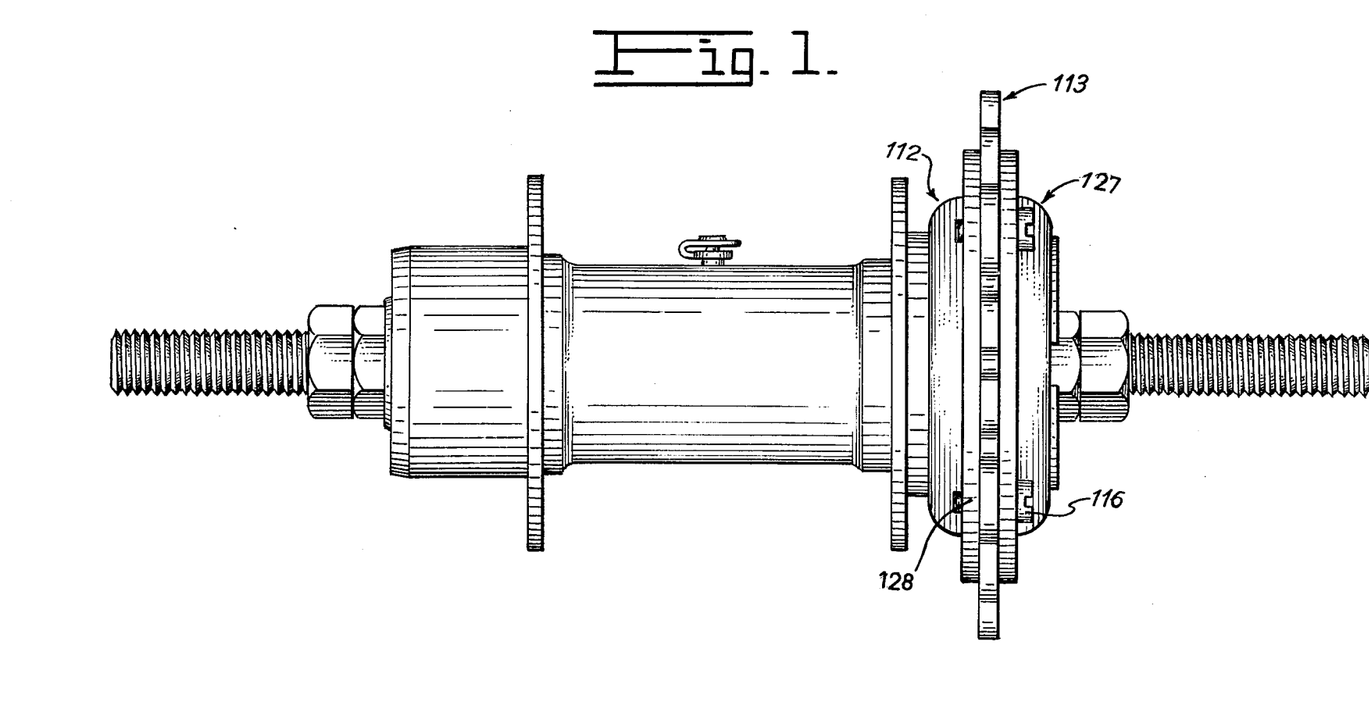
FIG. 1 shows an isometric view in elevation of the assembled free-wheeling mechanism of the present invention.
Figure 2:
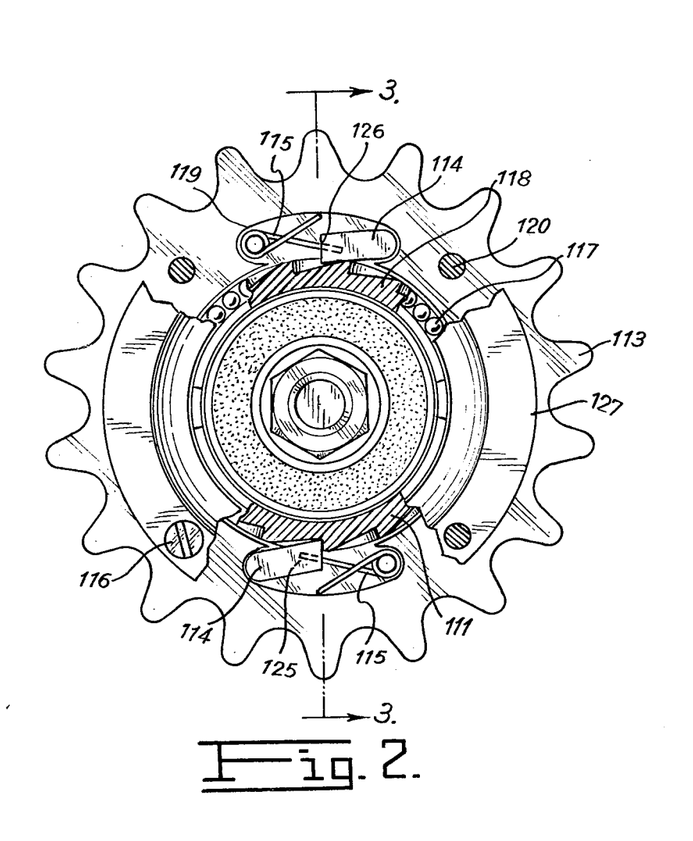
FIG. 2 is a view of one side of the assembled free-wheeling mechanism, partially cut away.

FIG. 2 shows the position of pawls 114 and springs 115, connected because spring end 126 passes through hole 125 in body of pawl 114; the pawl-and-spring assembly is housed in ellipsoidal slots 119 of central sprocket 113.

Figures 5, 6:
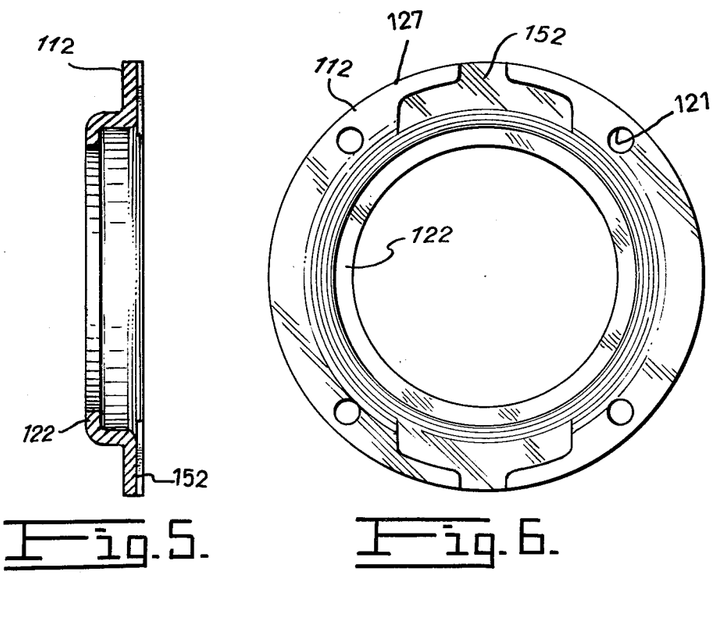
FIG. 5 is a view in vertical cross-section of the same cup, of the simple version of the free-wheeling mechanism.
FIG. 6 provides a view of the cup of the mechanism from the left displaying the draining surfaces for extraneous oil or liquid.
Figure 7:
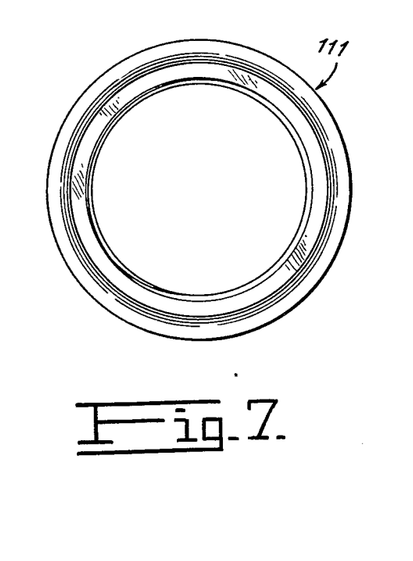
FIG. 7 provides a side view of the central sleeve of the simple free-wheeling mechanism.

FIG. 6 shows duct means in the form of draining slots 152 for liquids such as water or oil; they are formed in right cup 127 and left cup 112. Perforations 120 are provided in right cup 127 to admit screws 116, and tapped holes 128 are provided in left cup 112.

Figure 11:
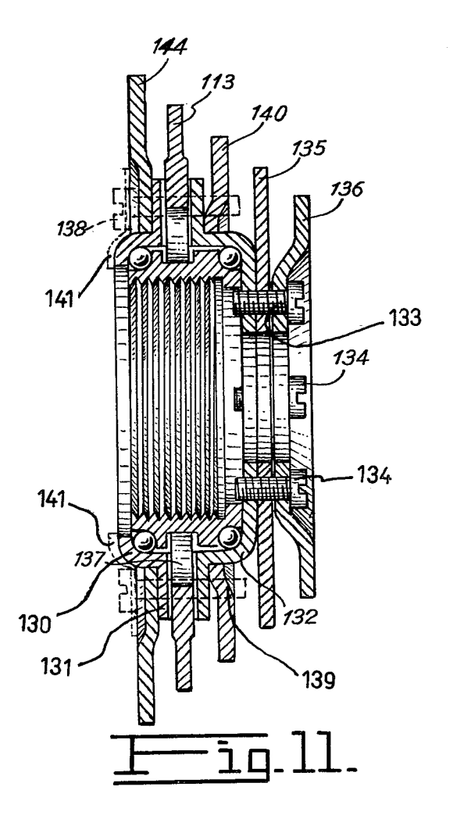
FIG. 11 shows a cross-section in a vertical plane of the mechanism of the multiple-sprocket free-wheeling unit when assembled. The ease of assembly by means of only four screws on each side will be noted.

FIG. 11 shows the multiple-sprocket assembly which incorporates a different right-hand cup No. 132 which, by having a smaller bore diameter than cup 127, provides a larger wall or flange area through which screws 134 are screwed to support additional sprockets 135 and 136.

FIG. 11 shows the multiple-sprocket assembly, in which right-hand cup 127 is replaced with right-hand cup 132, distinguished as above noted by having a smaller bore diameter. The increased flange area of cup 132 carries a plurality of tapped holes 133 receiving screws 134, and the screws 134 carry additional sprockets 135 and 136 pressed against flange face of cup 132. Further additional, and still larger, sprockets 140 and 144 are mounted on the outer shoulders of cups 130 and 132 and are secured by assembly screws 138 which are threaded into tapped bores 139 in sprocket 140.

Shielding disc 141 can also be mounted outboard of left cup 130 held in place by screws 138, to form a protective labyrinth helping to seal working parts of the free-wheeling mechanism.

Figure 14:
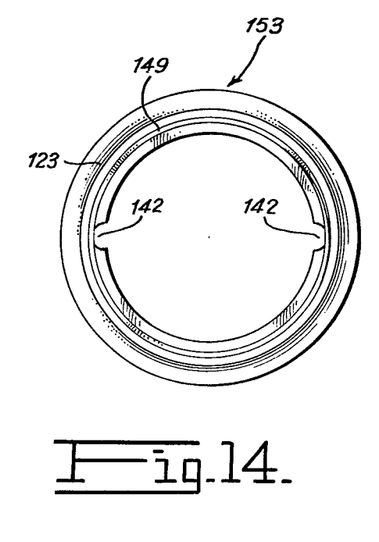
FIG. 14 is a view in elevation from the side of the central sleeve of the multiple version of the free-wheeling mechanism. Here it is possible to see the two special semicircular slots for extracting the multiple-sprocket free-wheeling mechanism from the axle on which it is mounted.
Figure 15:
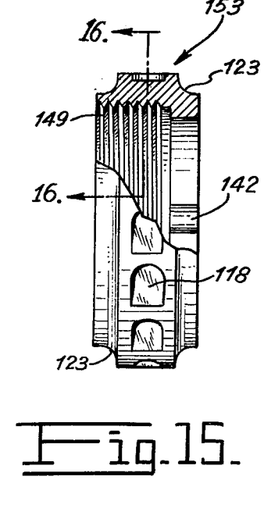
FIG. 15 is a partly cross-sectional view in front elevation of the multiple version of the free-wheeling mechanism. Here it is possible to see the thread required for assembling the wheel on the interior member to operate. In addition the peripheral milled slots of the collar are clearly shown.
Figure 16:
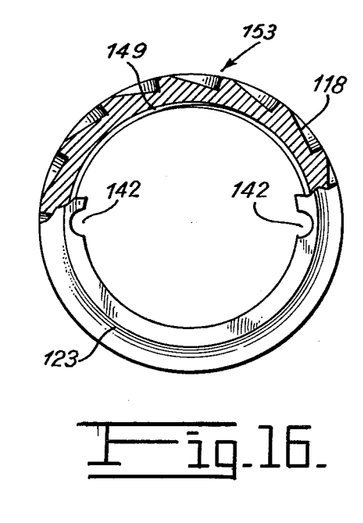
FIG. 16 provides a partial cross-section in a view in side elevation of the multiple version of the free-wheeling mechanism. The peripheral slots and the semicircular slots for extracting the unit are evident.
Figure 17:
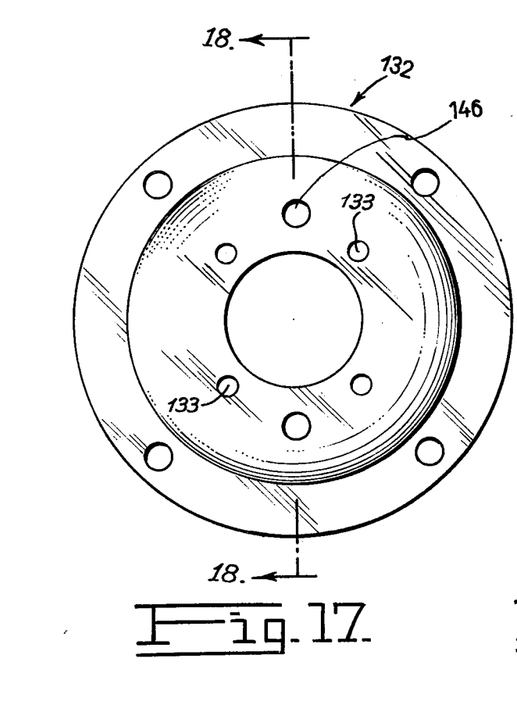
FIG. 17 affords a view in side elevation of the right hand cup of the multiple sprocket version of the free-wheeling mechanism. Here the difference in central diameter of this piece from that of the central bore of the simple version of the cup of the free-wheeling mechanism is evident. Two series of four holes are also to be noted, one of which is used for assembling the mechanism and the other for mounting the additional sprockets.
Figure 18:
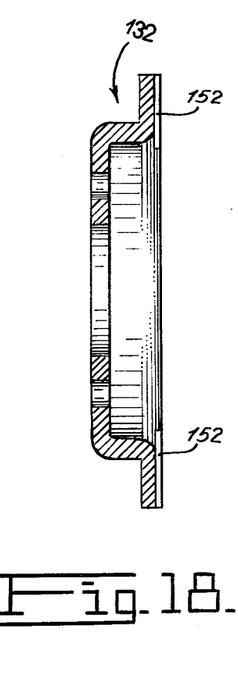
FIG. 18 shows the right hand cup of the multiple version of the free-wheeling mechanism in vertical section.
Figure 19:
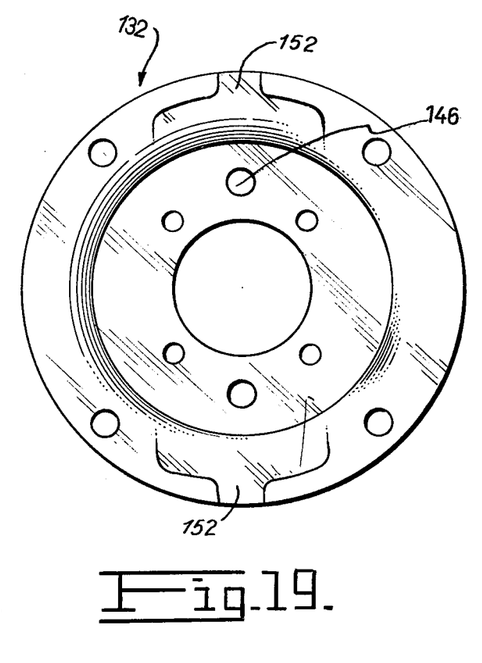
FIG. 19 is a rear view of the right cup of the multiple version of the free-wheeling mechanism. Here it is easy to see the special slots for draining extraneous liquids from the cup.

FIGS. 14, 15 and 16 show internal notches 142 in multiple-sprocket sleeve member 153, which align with holes 146 in right cup 132 and similar holes not shown in additional sprockets 135 and 136, to permit inserting an appropriate tool therethrough to seize sleeve member 153 by said notches 142 to unscrew said sleeve member 153 from the inner rotatable member upon which it is threadedly mounted for operation.

It will be noted that both in the simple one-sprocket free-wheeling mechanism of FIG. 3 and in multiple-sprocket mechanism of FIG. 11, spring 115 and cooperating pawls 114 are mounted within ellipsoidal slot 119 in central sprocket 113, and the seizing and the free-wheeling functions of the mechanism are the same in both embodiments.

While the present description has been directed to two preferred embodiments of the invention, it is evident that the invention is not limited by the foregoing description, but by the scope of the appended claims.

What is claimed is:

1. A freewheel mechanism comprising a tubular sleeve internally threaded for attachment to a wheel hub, a sprocket wheel having a central aperture defining an inner periphery dimensioned to seat coaxially around said sleeve, two cup members also apertured coaxially to seat around said sleeve and located one on each side of said sprocket wheel, said cup members each having a radially outwardly directed peripheral rim with the sprocket wheel sandwiched between and secured to said cup member rims, said sleeve having a peripheral ridge defined between two upstanding shoulders and each said shoulder cooperating with an internal shoulder on the juxtaposed cup member to define a ball race permitting free rotation of the secured sprocket wheel and cup members on said sleeve, said sprocket wheel being engageable with said sleeve for positive rotation therewith by a ratchet assembly comprising at least one ellipsoidal recess opening into the inner periphery of said sprocket wheel, an unsecured rockable pawl retained within said recess by mating contours on said pawl and one end of said ellipsoidal recess, spring means disposed within the opposite end of said recess and attached to said pawl to retain said pawl seated within the recess and to urge said pawl outwardly into driving engagement with said sleeve, and a plurality of pawl receiving indentations disposed in line peripherally around said ridge between said upstanding shoulders on the sleeve.

2. A freewheel mechanism as claimed in claim 1, wherein diametrically opposed ellipsoidal recesses open into the inner periphery of the sprocket wheel.

3. A freewheel mechanism as claimed in claim 1, wherein the cup members are secured one on each side of the sprocket wheel by bolt means extending through registering apertures in said cup members and sprocket wheel.

4. A freewheel mechanism as claimed in claim 1, wherein drainage duct means is provided in the cup members.

5. A freewheel mechanism comprising a tubular sleeve internally threaded for attachment to a wheel hub, a first sprocket wheel having a central aperture defining an inner periphery dimensioned to seat coaxially around said sleeve, two cup members also apertured coaxially to seat around said sleeve and located one on each side of said first sprocket wheel, said cup members each having a radially outwardly directed peripheral rim with the first sprocket wheel sandwiched between and secured to said cup member rims, at least one further sprocket wheel secured on the external surface of at least one cup member, said sleeve having a peripheral ridge defined between two upstanding shoulders and each said shoulder cooperating with an internal shoulder on the juxtaposed cup member to define a ball race permitting free rotation of the secured first sprocket wheel and cup members on said sleeve, said first sprocket wheel being engageable with said sleeve for positive rotation therewith by a ratchet assembly comprising at least one ellipsoidal recess opening into the inner periphery of said first sprocket wheel, an unsecured rockable pawl retained within said recess by mating contours on said pawl and one end of said ellipsoidal recess, spring means disposed within the opposite end of said recess and attached to said pawl to retain said pawl seated within the recess and to urge said pawl outwardly into driving engagement with said sleeve, and a plurality of pawl receiving indentations disposed in line peripherally around said ridge between said upstanding shoulders on the sleeve.

6. A freewheel mechanism as claimed in claim 5, wherein a plurality of sprocket wheels of different diameters and with different numbers of teeth are secured on said cup members.

7. A freewheel mechanism as claimed in claim 5, wherein two sprocket wheels are secured one on each outer side of the radially outwardly directed peripheral rims of the cup members.

8. A freewheel mechanism as claimed in claim 5, wherein one of said cup members has a wall portion extending over an end of said sleeve and at least one sprocket wheel is secured on said wall portion.

9. A freewheel mechanism as claimed in claim 5, wherein drainage duct means is provided in the cup members.

* * * * *